United States Patent [19]

Lesage et al.

[11] 3,725,331

[45] Apr. 3, 1973

[54] COMPOSITIONS CONTAINING AMORPHOUS 1,2-POLYBUTADIENE AND CIS-1,4-POLYBUTADIENE

[75] Inventors: Jean Lesage, Le Vesinet; Francois Dawans, Bougival, both of France

[73] Assignee: Institut Francois du Petrole, des Carburants et Lubrifiants, Hauts de Seine, France

[22] Filed: Oct. 8, 1970

[21] Appl. No.: 79,285

[30] Foreign Application Priority Data

Oct. 21, 1969 France..................................6936148

[52] U.S. Cl.................260/33.6 AQ, 260/41.5 R, 260/45.75 R, 260/45.9 R, 260/45.95, 260/894
[51] Int. Cl. ...............................................C08d 9/08
[58] Field of Search........................................260/894

[56] References Cited
UNITED STATES PATENTS 3,501,422  3/1970  Nordsiek et al. ..........................260/5

3,083,175  3/1963  Safford et al.........................260/45.5

FOREIGN PATENTS OR APPLICATIONS 684,622  4/1964  Canada ...............................260/894

Primary Examiner—Samuel H. Blech
Assistant Examiner—John Seibert
Attorney—Millen, Raptes and White

[57] ABSTRACT

New compositions consisting of 40-75 percent by weight of amorphous 1,2-polybutadiene having a molecular weight above 50,000 and 25-60 % by weight of 1,4-cis polybutadiene having a molecular weight above 100,000 result in sulfur vulcanizates having a low brittle point, a high elasticity modulus, and a low rebound and which swell to a relatively low degree when immersed in benzene.

4 Claims, No Drawings

COMPOSITIONS CONTAINING AMORPHOUS 1,2-POLYBUTADIENE AND CIS-1,4-POLYBUTADIENE

This invention relates to new compositions containing amorphous 1,2-polybutadiene of high molecular weight.

These compositions consist essentially of mixtures, in critical proportions, of amorphous 1,2-polybutadiene of high molecular weight and another polymerized unsaturated hydrocarbon having elastomeric properties, essentially 1,4-cis polybutadiene.

Amorphous 1,2-polybutadiene of high molecular weight is a known compound. It contains at least 90 percent of 1,2-units and has a crystallinity content of less than 2 percent, as determined at 20° C, and an average molecular weight of at least 50,000.

These characteristics may be determined according to the following methods:
- the microstructure (content of 1,2-units) by the infra-red spectrometric method, for example according to Ciampelli et al., in La Chemica e l'Industria 41, 1959, page 758.
- the weight average molecular weight by the light scattering method
- the crystallinity content at 20° C by X-ray spectrography, for example according to the method described in the Belgian Pat. 549, 554 of Jan. 14, 1957 or the French Pat. 1,154,938 (USP 2 905 646).

These amorphous 1,2-polybutadienes are practically free of gel and are soluble in a number of usual solvents, for example benzene, toluene, chloroform or carbon sulfide. They have been described, as well as their manufacture, for example in USP 3 451 987. The conventional vulcanization treatments may be applied thereto, such as those commonly applied to the hevea gums, for example vulcanization by means of sulfur or sulfur compounds, with various added charges.

However, vulcanizates obtained from amorphous 1,2-polybutadiene such as hereinbefore defined, have not been satisfactorily used in the tire industry, particularly in view of their insufficient properties in the cold: they have a a brittle point of about −20° C which is much too high as compared with the maximal value of −45° C required by tire manufacturers.

The main object of this invention is to provide new compositions which have surprisingly improved properties in this respect. These compositions have other advantages which will appear hereinafter, in particular surprisingly improved mechanical properties.

These compositions consist essentially of mixtures of amorphous 1,2-polybutadiene of high molecular weight such as hereinbefore defined with 1,4-cis polybutadiene having a content of 1,4-cis units greater than 85 percent and a weight average molecular weight of at least 100,000, said mixtures having a 1,4-cis polybutadiene content by weight of 25 to 60 percent, and a 1,2-polybutadiene content by weight of 40 to 75 percent.

These new compositions may be obtained by any conventional technique for admixing elastomers. For example, the constituents may be admixed in a roll-mixer at any convenient temperature, for example 30° to 80° C.

During this operation, conventional additives may be incorporated into the mixture, for example antioxidants, such as phenyl- $\beta$ -naphthylamine or tert butyl paracresol, various charges, such as carbon black, hydrocarbon oils, vulcanization agents such as sulfur, vulcanization accelerators, or again zinc oxide or stearic acid.

The resulting product may be vulcanized in a press under known conditions of temperature (about 130°–180° C, preferably 150° C) and pressure (for example 1 to 100 bars, preferably about 70 bars).

EXAMPLES

In order to show the properties of these compositions, there have been made various mixtures of 1,2-polybutadiene having a 1,2-units content of 91 percent, a crystallinity content of less than 2 percent and an average molecular weight of 400,000, with 1,4-cis polybutadiene having a 1,4 cis units content of 96 percent and an average molecular weight of 450,000.

Various vulcanization additives have been added thereto, while operating in an open mixer at 50° C, as follows:

To 30 kg of mixture, the following have been added:

| | |
|---|---|
| Phenyl-$\beta$-naphthylamine | 0.3 kg |
| Aromatic oil | 4.5 kg |
| Black ISAF | 13.5 kg |
| Stearic acid | 0.45 kg |
| Condensation product of diphenylamine with acetone | 0.3 kg |
| Sulfur | 0.6 kg |
| Zinc oxide | 1.5 kg |
| N-cyclohexyl-2-benzothiazyl sulfenamide | 0.3 kg |

The resulting mixtures have been maintained at 150° C and 70 bars for 30 minutes, so as to obtain vulcanizates. The composition and the properties of these vulcanizates are given in the following table:

| Vulcanizate number | 1 | 2 | 3 | 4 | 5 | 6 | 7 | 8 | 9 |
|---|---|---|---|---|---|---|---|---|---|
| 1,4-cis polybutad. (percent) | 0 | 20 | 25 | 30 | 40 | 50 | 60 | 80 | 100 |
| 1,2-polybutad. (percent) | 100 | 80 | 75 | 70 | 60 | 50 | 40 | 20 | 0 |
| Modulus at 300%, kg./cm.² | 80 | 83.5 | 95 | 118 | 106 | 102 | 93 | 84 | 82 |
| Resistance to breaking, kg./cm.² | 124 | 129 | 130 | 132 | 130 | 133 | 131 | 129 | 131 |
| Rebound (Schob) (percent) | 15.6 | 21.1 | 22.8 | 26.2 | 29.4 | 39.2 | 40.2 | 43.3 | 45.6 |
| Hardness DIDC | 62 | 62 | 63 | 65 | 64 | 65 | 64 | 65 | 61 |
| Brittle point, ° C | −24 | −59 | −72 | <−80 | <−80 | <−80 | <−80 | <−80 | <−80 |
| Swelling in benzene (percent by weight) | 346 | 334 | 323 | 315 | 315 | 321 | 319 | 318 | 332 |

From these results, it appears that:

1. The brittle point is below −45° C for vulcanizates containing at least 20 percent of 1,4-cis polybutadiene.

This sharp decrease could not be deduced from the values corresponding to the vulcanizates obtained from 1,2-polybutadiene alone and 1,4-cis polybutadiene alone.

2. The elasticity modulus at 300 percent is unexpectedly increased between 20 and 80 percent, particularly between 25 and 60 percent.

3. The swelling in benzene is substantially decreased in the same 25–60 percent range.

4. The rebound remains low in this concentration range.

Tires manufactured from these compositions have shown a better behavior on road.

The new compositions may be used with advantage for manufacturing damping rubber and driving belts.

What is claimed as this invention is:

1. A composition consisting essentially of a mixture of (a) a polybutadiene having a 1,2-units content of at least 90 percent, a crystallinity lower than 2 percent at 20° C and a weight average molecular weight of about 400,000, and (b) a polybutadiene having a 1,4-cis units content of at least 85 percent and a weight average molecular weight of at least 100,000, said mixture having a content by weight of said 1,2-polybutadiene from 40 to 75 percent and a content by weight of said 1,4-cis polybutadiene from 25 to 60 percent.

2. A sulfur-vulcanizate of the composition of claim 1.

3. A composition as defined by claim 1 further comprising an aromatic oil.

4. A sulfur-vulcanizate of the composition of claim 3.

* * * * *